US011442960B2

(12) United States Patent
Shiell et al.

(10) Patent No.: US 11,442,960 B2
(45) Date of Patent: Sep. 13, 2022

(54) EDGE KEY VALUE STORE FOR A DISTRIBUTED PLATFORM

(71) Applicant: VERIZON PATENT AND LICENSING INC., Basking Ridge, NJ (US)

(72) Inventors: Derek Shiell, Santa Monica, CA (US); Mehrdad Arshad Rad, Playa Del Rey, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 16/716,797

(22) Filed: Dec. 17, 2019

(65) Prior Publication Data
US 2021/0182310 A1 Jun. 17, 2021

(51) Int. Cl.
*G06F 16/27* (2019.01)
*H04L 67/1097* (2022.01)
*G06F 16/953* (2019.01)
*G06F 16/22* (2019.01)
*G06F 3/06* (2006.01)

(52) U.S. Cl.
CPC .............. *G06F 16/27* (2019.01); *G06F 3/067* (2013.01); *G06F 16/22* (2019.01); *G06F 16/953* (2019.01); *H04L 67/1097* (2013.01)

(58) Field of Classification Search
CPC ......... G06F 16/27; G06F 16/22; G06F 16/953
USPC ....................................................... 707/636
See application file for complete search history.

(56) References Cited

U.S. PATENT DOCUMENTS

| 9,218,616 | B2* | 12/2015 | Van Biljon | H04L 63/0236 |
| 9,648,007 | B1* | 5/2017 | Sterling | H04L 63/0807 |
| 9,747,319 | B2* | 8/2017 | Bestler | G06F 3/067 |
| 9,984,002 | B2* | 5/2018 | Sundaravaradan | |
| | | | | G06F 12/0848 |
| 10,303,669 | B1* | 5/2019 | Stephens | G06F 16/13 |
| 10,437,712 | B1* | 10/2019 | Tyler | G06F 11/3684 |
| 11,089,105 | B1* | 8/2021 | Karumbunathan | G06F 3/067 |
| 11,100,129 | B1* | 8/2021 | Popick | G06F 16/2365 |
| 11,113,294 | B1* | 9/2021 | Bourbie | G06F 16/24568 |
| 2010/0262498 | A1* | 10/2010 | Nolet | G06Q 30/0251 |
| | | | | 705/14.71 |
| 2014/0095324 | A1* | 4/2014 | Cabral | G06Q 30/08 |
| | | | | 705/14.71 |
| 2014/0379840 | A1* | 12/2014 | Dao | H04L 67/5681 |
| | | | | 709/219 |
| 2016/0057163 | A1* | 2/2016 | Boffa | H04L 63/1425 |
| | | | | 726/23 |
| 2016/0110434 | A1* | 4/2016 | Kakaraddi | H04L 41/122 |
| | | | | 707/602 |

(Continued)

*Primary Examiner* — Mark E Hershley

(57) ABSTRACT

Provided is an edge key value ("EKV") store for receiving data from any of network location of a distributed platform, and for distributed a synchronized copy of the data to servers at the network locations where the data is requested regardless of where, how, and when the data is updated. The EKV store may receive a first value for a key at a first storage device of the EKV store based on a message issued by a first user through a first network location, may receive a second value for the key at a second storage device of the EKV store based on a message issued by a second user through a second network location, and may store the second value as a current value for the key by forming a consensus across the storage devices that the second value is the most recent value for the key.

20 Claims, 13 Drawing Sheets

(56) References Cited

U.S. PATENT DOCUMENTS

| | | | |
|---|---|---|---|
| 2016/0182473 A1* | 6/2016 | Cignetti | H04L 63/061 |
| | | | 713/171 |
| 2017/0124168 A1* | 5/2017 | Ullrich | G06F 16/27 |
| 2017/0346804 A1* | 11/2017 | Beecham | H04L 67/02 |
| 2018/0019985 A1* | 1/2018 | Schoof | H04L 9/3242 |
| 2018/0129585 A1* | 5/2018 | Martin | G06F 11/3664 |
| 2018/0255106 A1* | 9/2018 | Wiesmaier | H04L 63/205 |
| 2018/0260125 A1* | 9/2018 | Botes | G06F 3/0617 |
| 2018/0278725 A1* | 9/2018 | Thayer | H04L 67/561 |
| 2018/0300318 A1* | 10/2018 | Sittel | G06F 40/58 |
| 2019/0141041 A1* | 5/2019 | Bhabbur | H04L 63/20 |
| 2019/0149342 A1* | 5/2019 | Fynaardt | H04L 9/3268 |
| | | | 713/156 |
| 2019/0288850 A1* | 9/2019 | Beecham | G06F 21/64 |
| 2019/0340273 A1* | 11/2019 | Raman | G06F 16/2315 |
| 2019/0356609 A1* | 11/2019 | Grunwald | G06F 16/275 |
| 2019/0394042 A1* | 12/2019 | Peddada | H04L 9/0894 |
| 2020/0403994 A1* | 12/2020 | Bitterfeld | G06F 21/45 |

\* cited by examiner

EDGE KEY VALUE STORE FOR A DISTRIBUTED PLATFORM

BACKGROUND

Cloud-based offerings have allowed users to shift the storage and access of some content and services from client devices to servers in the network. The cloud-based content and services are no longer tied to a single client device, and can be accessed from any client device. For instance, the network servers may stream content to the client devices on demand. The servers may also execute different functions or services on behalf of the client devices so that the client devices can access the services without the hardware or resources needed to execute the services.

A distributed platform, such as a content delivery network ("CDN"), may deploy servers to different network locations. The distributed platform may replicate some of the same content and services on different servers at different network locations so that the cloud-based content and services can be served with less latency to users and client devices that are geographically proximate. However, as the content or services are replicated to more servers or network locations, it becomes more difficult to ensure that each server or network location is providing the same content or service rather than an obsolete or outdated copy, especially for content and services that are frequently updated and when the content and services can be updated via any server or network location.

DETAILED DESCRIPTION OF PREFERRED EMBODIMENTS

The following detailed description refers to the accompanying drawings. The same reference numbers in different drawings may identify the same or similar elements.

Disclosed are systems and methods for a multi-tenant edge key value ("EKV") store. The EKV store may receive data for content and services, that are provided at different network locations of a distributed platform, from any of the network locations, and may manage an updated and persistent replication of the data across servers at the network locations where the data, content, and/or services are requested and/or executed. The EKV store therefore provides a facility within the distributed platform to synchronize the data across the distributed platform regardless of where, how, and when the data is updated.

The synchronized data may be used to configure and/or provide input to the servers at the different network locations of the distributed platform and/or services executed by the servers. The synchronized data may be used to distribute the same content from the servers at the different network locations to different client devices.

The data may be represented as key-value pairs with keys for identifying and/or accessing the data, and with values that correspond to the data identified by the key. For instance, the data or key-value pairs may include content that a user wants to directly access or distribute from the distributed platform, parameters for configuring services (e.g., functions, executable code, scripts, etc.) that are executed by the distributed platform servers, inputs for the executed services, state or output of an executed service, parameters for configuring the operation of the servers, and/or other forms of data. The EKV store may store different key-value pairs for the same service in order to configure the service differently for different users, provide different user input to the service, and/or track different output resulting for the service for different users. Moreover, the EKV store allows different users to update the same particular data for the same content or service from different network locations of the distributed platform without different versions of the particular data becoming accessible from the different network locations.

Figure 1:
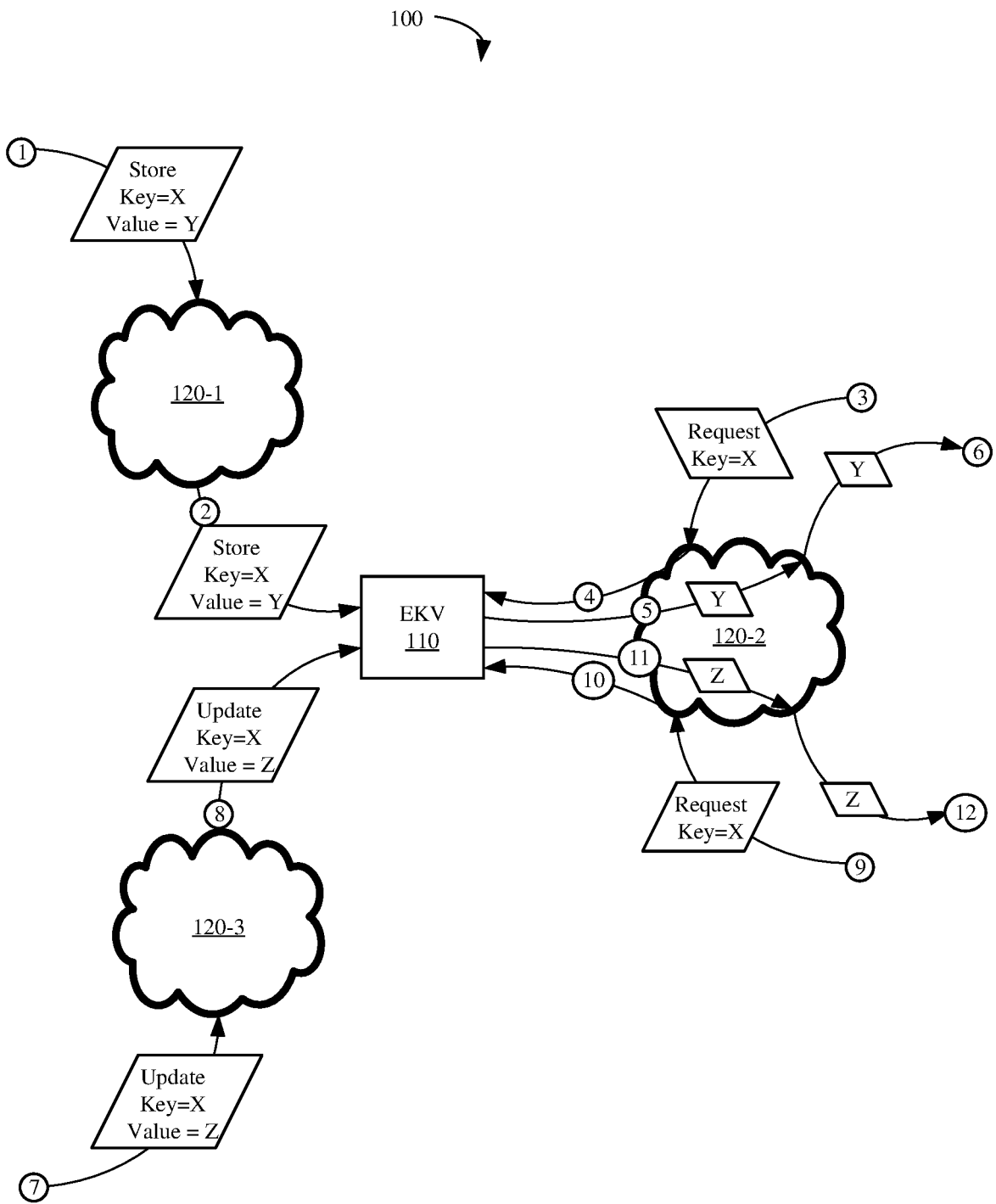
FIG. 1 illustrates an example of an edge key value ("EKV") store synchronizing data across different network locations of a distributed platform in accordance with some embodiments presented herein.

FIG. 1 illustrates an example of EKV store 110 synchronizing data across different network locations 120 of distributed platform 100 in accordance with some embodiments presented herein. As shown in FIG. 1, distributed platform 100 may include first network location 120-1, second network location 120-2, and third network location 120-3 (sometimes collectively referred to as "network locations 120" or individually as "network location 120"). Network locations 120 may include servers or devices that respond to user requests for content, services, or data using the data that may be entered or changed via any network location 120 and that is synchronized and stored within EKV store 110.

As shown in FIG. 1, a first user, using a first client device, may provide (at 1) a request to store a first key-value for data that is to be subsequently accessed from distributed platform 100. The request may be routed to a server in first network location 120-1 when first network location 120-1 is the closest network location 120 to the first user, or when first network location 120-1 is otherwise selected as the network location 120 from which the first user may access distributed platform 100.

The first key-value may include a first key that identifies the instance of data, and a first value that provides the data contents. The first key and other keys of provided key-value pairs may be structured so as to identify a user, a particular content, a particular service, and/or other identifiers that differentiate the instance of data from other instances of data. The first value may include one or more alphanumeric characters, symbols, files, code, commands, and/or other assets.

The receiving server within first network location 120-1 may provide (at 2) the first key-value to EKV store 110. EKV store 110 may store the first key-value (e.g., store the first key with the first value).

A second user, using a second client device, may request (at 3) the first key-value. In particular, the second user may submit (at 3) a request for the current value of the first key-value by including the first key in the request. The request of the second user may route to a server in second network location 120-2 because of geographic proximity of second network location 120-2 to the second user or other routing criteria. The first key-value is not cached at second network location 120-2. Accordingly, the request is forwarded (at 4) from second network location 120-2 to EKV store 110. In some embodiments, the request may traverse additional network locations of distributed platform 100 before reaching EKV store 110.

In response to the request for the first key-value, and specifically, in response to the first key provided in the request, EKV store 110 may provide (at 5) the first value to the server in second network location 120-2, and the server may provide (at 6) the first value from second network location 120-2 to the second user in response to the second user's request.

A third user may update the first key by changing the first value of the first key to a second value. In particular, the third user may provide (at 7) an update request with the first key and the second value to a server in third network location 120-3.

The receiving server in third network location 120-3 may forward (at 8) the update request to EKV store 110. EKV store 110 may determine that an entry exists for the first key, and may replace the first value with the second value from the update request.

The second user or a different fourth user may request (at 9) the first key-value via second network location 120-2. Second network location 120-2 may forward (at 10) the request to EKV store 110. EKV store 110 may return (at 11) the recently updated second value for the first key to second network location 120-2, and second network location 120-2 may provide (at 12) the second value in response to the request.

FIG. 1 illustrates different users (e.g., the first user and the third user) entering different values for the same key from different network locations (e.g., first network location 120-1 and third network location 120-3), other users accessing the current value for the first key from yet another network location (e.g., second network location 120-2) based on EKV store 110 synchronizing the distributed data across distributed platform 100. In doing so, distributed platform 100, via the synchronization performed at EKV store 110, may provide different users access to the same data or content without the users having to access the data or content from the same network location and without the users having to update the data or content at the network locations where the data or content is accessed.

Users may additionally, or alternatively, leverage EKV store 110 to distribute data that can be used to configure or provide input to services (e.g., functions, user-defined code, applications, etc.) that are executed from different network locations 120 of distributed platform 100. Specifically, EKV store 110 provides a synchronized distribution of the data so that the users can simply submit the data to EKV store 110 via any of network locations 120 without individually configuring each running instance of a service at a different network location 120 with the data, and without connecting to or otherwise accessing the particular network location 120 where a service is to be configured or is to receive the data. Stated differently, EKV store 110 allows a user to update the configuration parameters or inputs of a particular service, that is requested from and executed at one or more network locations 120, by submitting the configuration parameters or inputs as key-value pairs to any network location 120 of distributed platform 100. EKV store 110 may then synchronize all running instances of the particular service at different network locations 120 of distributed platform 100 with the latest configuration parameters, inputs, and/or other data for that particular service.

Figure 2:
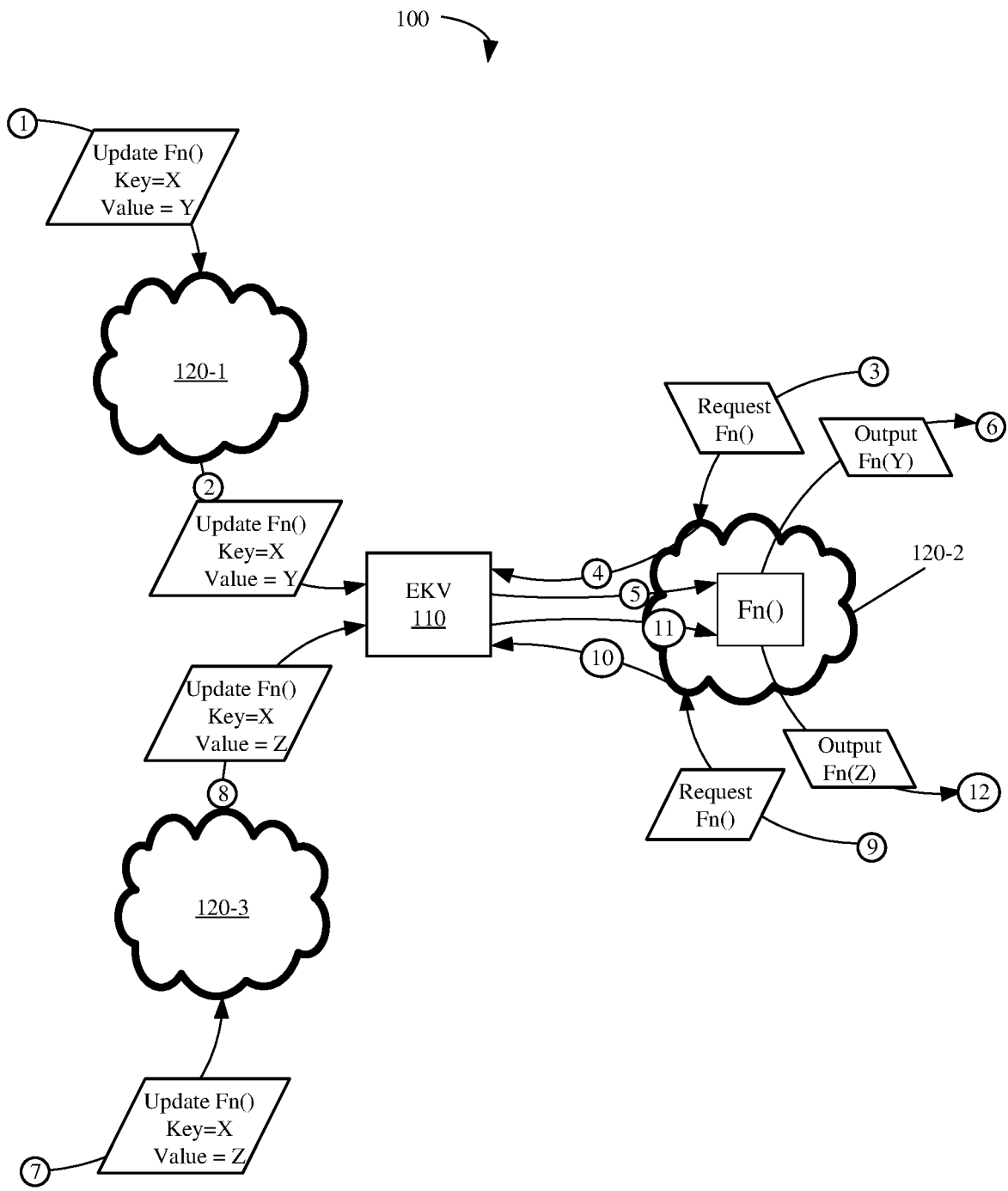
FIG. 2 illustrates an example of the EKV store receiving inputs for a particular function from anywhere in the distributed platform, and applying the inputs to instances of the particular function executing anywhere in the distributed platform in accordance with some embodiments presented herein.

FIG. 2 illustrates an example of EKV store 110 receiving inputs for a particular function from anywhere in distributed platform 100, and applying the inputs to instances of the particular function executing anywhere in distributed platform 100 in accordance with some embodiments presented herein. As shown in FIG. 2, a first user may upload (at 1) a first key corresponding to a particular function input, and a first value to serve as the particular function input. The first user may transmit (at 1) the first key and the first value to a server in first network location 120-1, and the server may send (at 2) the key-value pair to EKV store 110. EKV store 110 may store the first value for the first key of the particular function.

A second user may submit (at 3) a request to execute the particular function at second network location 120-2. A server within second network location 120-2 may instantiate an executable instance of the particular function, and may determine that an input or configuration parameter is required to execute the particular function. Accordingly, the server may request the input or configuration parameter from EKV store 110 by issuing (at 4) a request for the first key. In some embodiments, the server may request a container or other instance of the particular function from EKV store 110 at the same time as requesting the first key, and run the particular function upon receiving and loading the container or instance of the particular function.

EKV store 110 may provide (at 5) the server in second network location 120-2 with the first value that is currently stored for the first key, and the server may execute the particular function using the first value as an input or configuration parameter for the particular function. The result of executing the particular function with the first value may be provided (at 6) to the second user in response to the request from the second user to execute the particular function.

A third user may update the first key for the particular function via third network location 120-3 by providing (at 7) a second value to replace the first value that was previously stored for the first key. A server within third network location 120-3 may forward (at 8) the key-value pair of the first key and the second value to EKV store 110, and EKV store 110 may synchronize the data for the particular function by replacing the first value for the first key with the second value.

The second user or a fourth user may request (at 9) execution of the particular function at second network location 120-2. The particular function may already be initialized on a server in second network location 120-2 because of the earlier request made (at 3) to second network location 120-2. In this case, the server may avoid the latency associated with retrieving and initializing an instance of the particular function. In some embodiments, the particular function may be initialized on resources of another server in second network location 120-2. In any case, the particular function may require an input or configuration parameter before execution. Accordingly, the executing server may submit (at 10) to EKV store 110 a request for the first key corresponding to the input or configuration parameter of the particular function. EKV store 110 may provide (at 11) the second value, that was used to overwrite the first value for the first key, to the executing server in second network location 120-2. The server may execute the particular function using the second value as the input or configuration parameter, and may provide (at 12) the result of executing the particular function with second value to the requesting user.

FIG. 2 illustrates different users (e.g., the first user and the third user) changing inputs or configuration data of the particular function that is being executed at second network location 120-2 without accessing second network location 120-2 or requiring knowledge that the particular function is running at second network location 120-2 or elsewhere in distributed platform 100. EKV store 110 facilitates the synchronized yet distributed manner by which the data for the particular function is entered into and distributed across distributed platform 100. More specifically, EKV store 110 allows the first user, the third user, and/or other function originators or administrators the ability to remotely reconfigure the particular function from any network location 120 of distributed platform 100, and for servers at the same or different network locations 120 to run with synchronized input or configuration data without any direct interaction with the users and/or function originators or administrators. Consequently, the function originator or administrator can provide code for an executable function one time, can rely on distributed platform 100 to localize execution of the function for different sets of requesting users at network locations 120 that are closest to those sets of requesting users, and can still reconfigure or update the function by changing key-value pairs, that affect runtime operation of the function at each network location 120 where the function runs, via messaging that is exchanged with any network location 120 of distributed platform 100.

Figure 3:
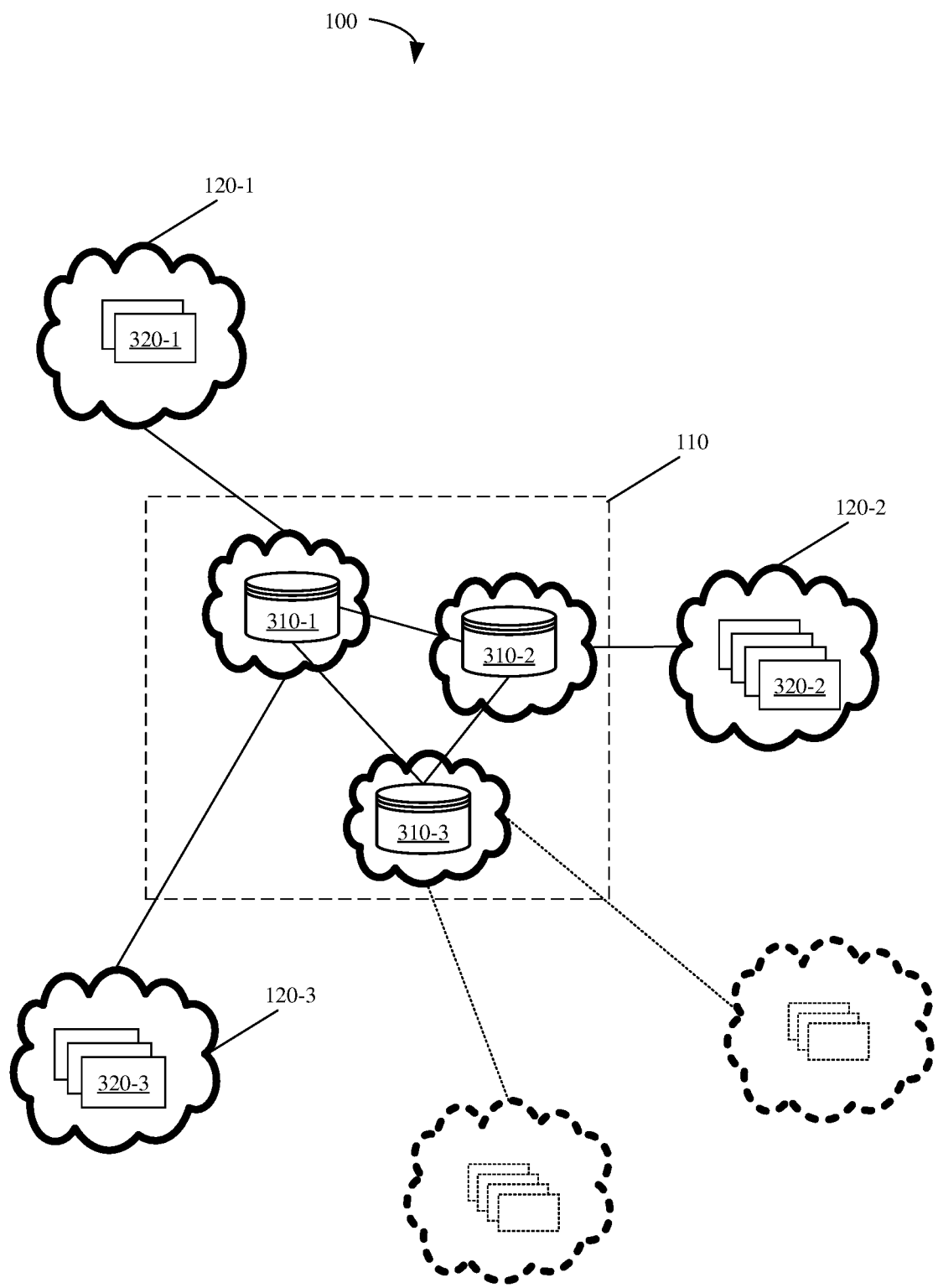
FIG. 3 presents an example architecture for the EKV store operating within the distributed platform in accordance with some embodiments presented herein.

FIG. 3 presents an example architecture for EKV store 110 operating within distributed platform 100 in accordance with some embodiments presented herein. EKV store 110 may be implemented using a geo-distributed set of databases 310-1, 310-2, and 310-3 (sometimes collectively referred to as "databases 310" or individually as "database 310") that are within a core or tier of distributed platform 100 that is below network locations 120. In some embodiments, EKV store 110 may include more or less databases 310, and the number of databases 310 may be based on the size of distributed platform 100, the distance between network locations 120, the amount of data, and/or the type of content and/or services that are accessible from distributed platform 100.

Each network location 120 may include one or more servers or other network devices. For instance, first network location 120-1 may include one or more servers 320-1, second network location 120-2 may include one or more servers 320-2, and third network location 120-3 may include one or more servers 320-3 (sometimes collectively referred to as "servers 320" or individually as "server 320").

Servers 320 at network locations 120 form a first-tier of distributed platform 100 at which user requests are received and answered. For instance, servers 320 may receive and respond to requests for content or data, requests for services, and/or requests for entering, updating, or accessing data to EKV store 110. Servers 320 may include a cache for temporarily storing, in memory or storage, the content, services, and/or data, wherein the data may be retrieved from EKV store 110 and may be used to fulfill user requests for content and/or services.

Databases 310 of EKV store 110 may be located in different network locations. Each database 310 may be closer to or may be a primary point of data retrieval and storage for a different subset of network locations 120. For instance, servers 320-1 within first network location 120-1 and servers 320-3 within third network location 120-3 may obtain key-value pairs, that serve as input, configuration, or stored data, from database 310-1, and servers 320-2 within second network location 120-2 may obtain key-value pairs from database 310-2.

Databases 310 may store the data values as files or table entries that are indexed based on the corresponding keys. Databases 310 may return a specific value of a key-value pair based on a request for the key associated with that specific value, or may return multiple values or a set of data in response to a query that implicates multiple keys associated with the multiple values or the set of data.

Databases 310 may remain synchronized by replicating any new or updated data (e.g., key-value pairs) that one database 310 receives across the other databases 310 of EKV store 110. Accordingly, EKV store 110 may represent a distributed set of databases that are strongly consistent or eventually consistent. In some embodiments, EKV store 110 may be implemented using Yugabyte databases, may be based on the Yugabyte platform, or may be based on another geographically distributed database platform.

Databases 310 may use one or more techniques to reach a consensus on a correct value for a key, especially a key that is frequently updated or that is updated simultaneously or contemporaneously from different network locations 120 before a particular value is replicated across databases 310 of EKV store 110. In some embodiments, databases 310 may provide synchronized replication of data based on timestamps that identify origination times for the data. When the same key is updated at two different databases 310 via different network locations 120, databases 310 may reference the timestamps to determine the most recent value to store for the key. For instance, a first user may provide a first value for a first key at a first time to database 310-1 via network location 120-1, and a second user may provide a second value for the first key at a second time to database 310-2 via network location 120-2 before the first value can be replicated across databases 310. In this instance, database 310-1 may receive and distribute the first value for the first key to databases 310-2 and 310-3. At about the same time, database 310-2 may receive and distribute the second value for the first key to databases 310-1 and 310-3. Databases 310 may then compare the timestamps for the different values. Each database 310 may determine that the most recent value is the second value, and may therefore store the second value for the first key. In this manner, databases 310 may ensure data consistency regardless of how many updates are made to a particular key, when the updates are made, or to which database 310 those updates are made.

Figure 4:
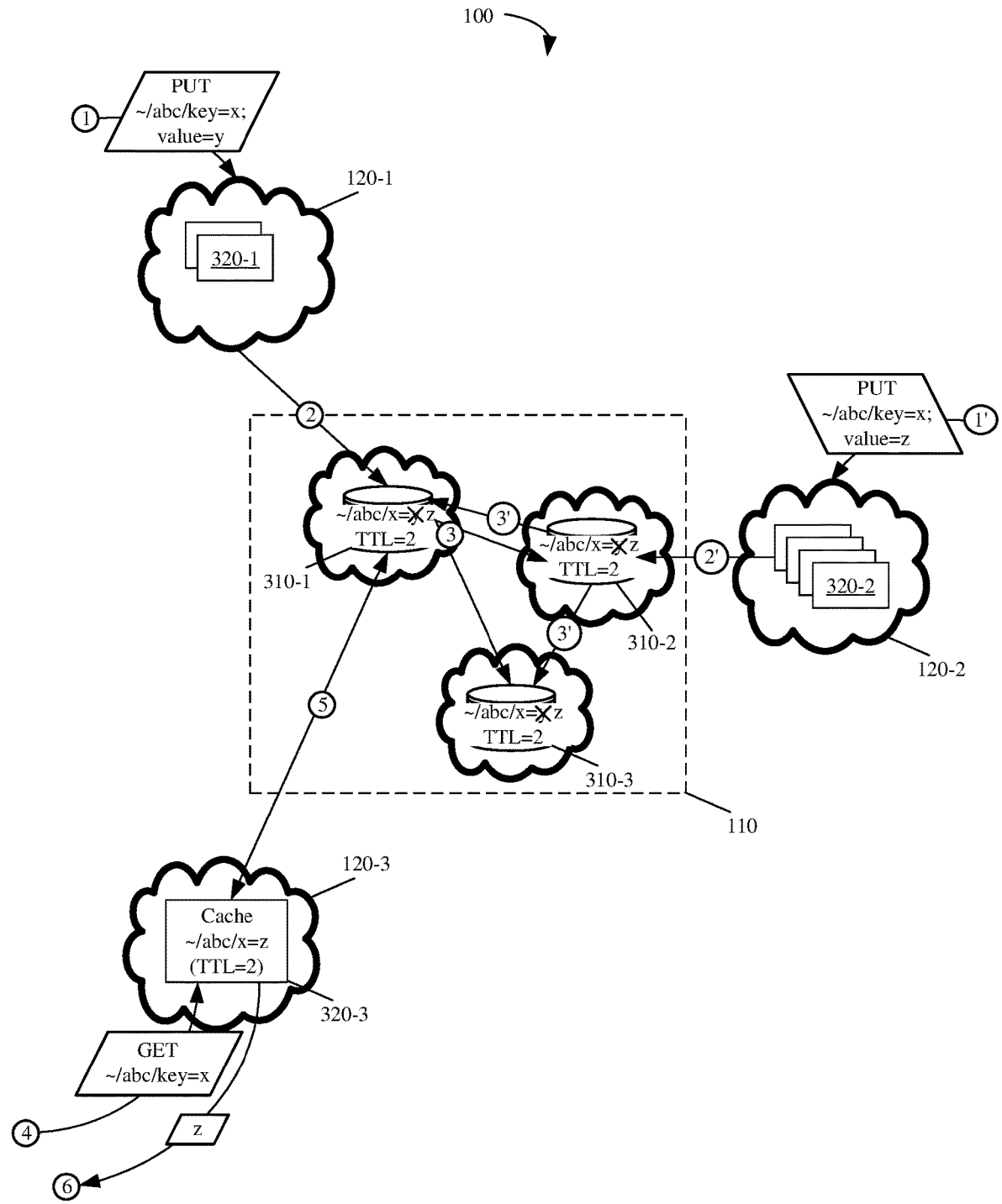
FIG. 4 illustrates an example of the EKV store synchronizing the value of a particular key, in accordance with some embodiments, after writes to the particular key from different network locations.

FIG. 4 illustrates an example of EKV store 110 synchronizing the value of a particular key, in accordance with some embodiments, after writes to the particular key from different network locations. As shown in FIG. 4, a first user may write (at 1) a first value for the particular key into EKV store 110 via first network location 120-1. First network location 120-1 may forward (at 2) the write request from the first user to database 310-1, and database 310-1 may perform (at 3) a synchronization procedure to replicate the first value for the particular key across databases 310-2 and 310-3 of EKV store 110.

At or about the same time, a second user may write (at 1') a second value for the particular key into EKV store 110 via second network location 120-2. Second network location 120-2 may forward (at 2') the write request from the second user to database 310-2, and database 310-2 may also perform (at 3') the synchronization procedure to replicate the second value for the particular key across databases 310-1 and 310-3 of EKV store 110.

The synchronization procedure allows databases 310 to identify the conflicting values that are received for the particular key, and to resolve the conflict by reaching a consensus to store the second value instead of the first value. The prioritization of the second value over the first value may be based on the second user initiating the write request after the first user, such that the second value has a later timestamp than the first timestamp. The prioritization of the second value may, additionally or alternatively, be based on the second user having higher priority than the first user, the second value having greater significance than the first value, and/or other consensus protocols.

A third user may issue (at 4) a read request for the particular key via third network location 120-3. Third network location 120-3 may read the second value for the particular key from database 310-1 once the synchronization procedure is complete and consensus is reached on the second value, and may provide (at 6) the second value to the requesting user. Other read requests for the particular key from any of network locations 120 will similarly result in the second value being returned from EKV store 110 regardless of which database 310 responds to the request.

In some embodiments, the key-value pairs stored in databases 310 may correspond to user data, service data, configuration data, or other data. The user data may include data that is to be distributed to client devices from servers 320 in network locations 120. The service data may specify a setting, a value, an input, and/or a configuration parameter for any service run from or provided by any server 320 of network locations 120 to requesting users. The configuration data may be used to control or modify server operations or behavior. For instance, the configuration data may specify a cache replacement policy for a server or a time to retain content in server cache. In some embodiments, databases 310 may also store and distribute copies of services that are executed at network locations 120. For instance, databases 310 may store function inputs, function configuration parameters, and the function code or executable instance of the function (e.g., a container or executable image). Database 310 may also be used to synchronize the storage and distribution of other data including system data for tracking network attacks, performance, statistics that are aggregated from servers 320 at network locations 310, or other aspects of distributed platform 100, and/or state data for tracking users, user activity, service output, and metadata. For instance, the state data can be used to track items placed in a digital shopping cart when the user accesses a service from different network locations 120, or to track user progression through an application or service when the user accesses the service from different network locations 120.

Distributed platform 100 may adapt network messages for entering data into EKV store 110 and for accessing data from EKV store 110. For example, HyperText Transfer Protocol ("HTTP") POST and PUT messages may be used to enter data into EKV store 110, and HTTP GET messages may be used to read data from EKV store 110. Messaging of other network protocols may similarly be used to communicate with EKV store 110.

In some embodiments, the Uniform Resource Locator ("URL") of a network message may be used to specify one or more keys whose values are requested, or one or more key-value pairs to be written to EKV store 110. For example, the key-value pairs may be specified as query string parameters.

In some embodiments, the keys may be specified in the URL, and the values for the specified keys may be provided in the message body or as files that are transmitted with the packets directed to the URL. In some such embodiments, the values may be specified in the message body using JavaScript Object Notation ("JSON") or another format.

In some embodiments, the URL or other identifier used to communicate with EKV store 110 may be structured to delimit keys or key-value pairs for different customers, different content or services of a particular customer, or different users or state of a particular content or service of a particular customer. The structure allows the same key to have different values for different users, content, services, etc.

Figure 5:
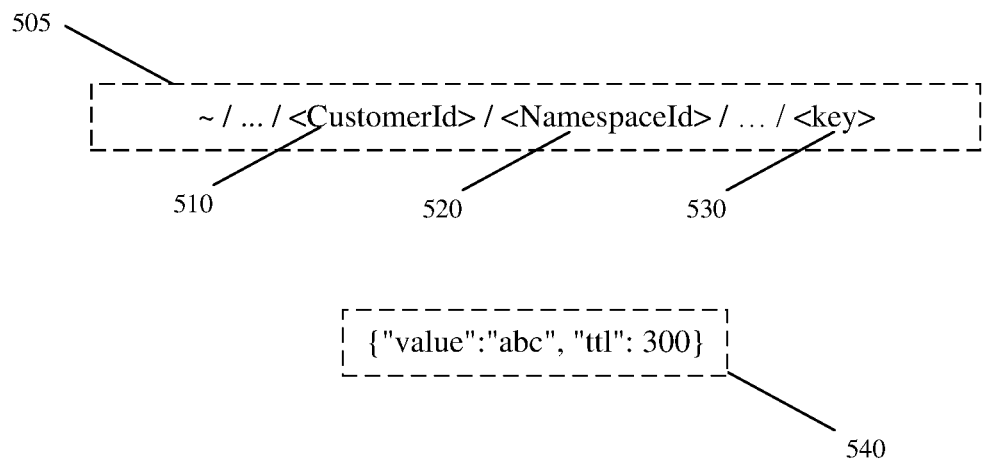
FIG. 5 illustrates an example structure for an identifier that may be used to enter data to or request data from the EKV store in accordance with some embodiments presented herein.

FIG. 5 illustrates an example structure for identifier 505 that may be used to enter data to or request data from EKV store 110 in accordance with some embodiments presented herein. As shown in FIG. 5, identifier 505 may correspond to a URL or path with segments 510, 520, and 530.

Segment 510 may specify a first identifier that identifies a customer or user of distributed platform 100. More specifically, the customer may be a user that leverages distributed platform 100 for data or content distribution, service execution, and/or other functionality. The first identifier may include a domain name or an assigned value that represents the customer. Segment 510 can be used by each customer to create and store their own set of data (e.g., key-value pairs) and to distinguish their data from the data of other customers of distributed platform 100. More specifically, segment 510 can be used to prevent one customer from writing and/or reading the data of another customer.

Segment 520 may specify a second identifier that identifies different namespaces of a particular customer. The namespaces may correspond to different groupings of keys defined by the particular customer. Each namespace can be used to store data for a different content or service of the particular customer. For instance, the particular customer may upload and execute two different functions on distributed platform 100. The particular customer may define a first namespace (e.g., a first value for segment 520) to specify data (e.g., configuration data or inputs) for the first function, and may define a different second namespace (e.g., a different second value for segment 520) to specify a separate set of data for the second function. Alternatively, the first namespace may be used to track data resulting from a first user using the first function, and the second namespace may be used to track data resulting from a different second user using the first function. In this latter example, the first namespace may be formed from a combination of the first function name and the first user identifier, and the second namespace may be formed from a combination of the first function name and the second user identifier. Should the first user access the first function using different servers 320 or from different network locations 120, EKV store 110 may synchronize the data for the first function and the first user to the first namespace such that the different servers 320 or different network locations 120 can execute the first function for the first user using the same synchronized set of data.

Segment 530 may specify a third identifier that identifies a key within the namespace identified by segment 520. The same third identifier may be used to identify different keys when the third identifier is used in conjunction with URLs where one or more of segment 510 and segment 520 are different. In this case, EKV store 110 may store different values for the same key of different customers or different namespaces. For instance, identifiers 505 "~/ . . . /customer1/movieX/key1" and "~/ . . . /customer1/function/key1" specify the same key ("key1"), but are directed to different namespaces of "customer1", and therefore link to different data or key-value pairs stored by EKV store 110.

In some embodiments, segment 530 may be modified to also provide the value for the specified key. For instance, segment 530 may be specified as "<key>:<value>", wherein <value> provides the value for <key> and be an alphanumeric character string or a link to a file.

In some embodiments, the value for the key identified by the combination of segments 510, 520, and 530 may be provided in the body of the corresponding network message. Segment 540 presents an example format for defining a value "abc" in the message body for the key identified by segments 510, 520, and 530 in the URL. In some embodiments, segment 540 may provide a link for accessing a value rather than the value itself. For instance, segment 540 may provide a link to a file that contains the value(s) for a specified key. The file may be sent as one or more data packets or may be accessed from a remote location. The file may be formatted as a JSON file or other file, and provides an efficient means by which multiple values can be written to or accessed from EKV store 110 at one time using a single key.

Other parameters or data attributes can be specified in segment 540 in addition to a value or link. For instance, segment 540 may include a time-to-live ("TTL") parameter for the key-value pair. In some embodiments, segment 540 may be used to specify a complex operation (e.g., a counter or hashmap) instead of a value or link. For instance, segment 540 may specify a defined type for an action, query, or operation to perform (instead of a value or link for a key), or may include an additional field to specify an action, query, or operation to perform (e.g., increment, decrement, insert, delete, list, exists, etc.).

In some embodiments, one or more of segments 510, 520, 530, and 540 may be split into additional segments, or may be combined into fewer segments. For instance, segments 510 and 520 may be combined to form a single segment of identifier 505.

In some embodiments, additional segments may be included as part of identifier 505 (e.g., included in the URL or appended as a query string parameter), the message header, or the message body. For instance, an authorization token, password, or other security parameter may be included in identifier 505, the Authorization header, or the message body for access restriction or other purposes. EKV store 110 may use the authorization token to determine if the requestor is permitted to write to and/or read a specific key, a specific namespace, or data of a specific customer. In other words, EKV store 110 may limit which users can read and write certain keys by incorporating an authorization token or authorization value directly within the request URL or request messaging. Servers 320 and/or databases 310 may analyze the token, that is provided with a request, to determine whether the requestor has permissions to write to one or more keys that are implicated by the request, or to read values from one or more keys that are implicated by the request. For instance, a token may allow a user to read a first set of keys but only write to a subset of the first set of keys. Alternatively, a first token may provide a user only read access to data (e.g., key-value pairs) associated with a particular function or service.

Figure 6:
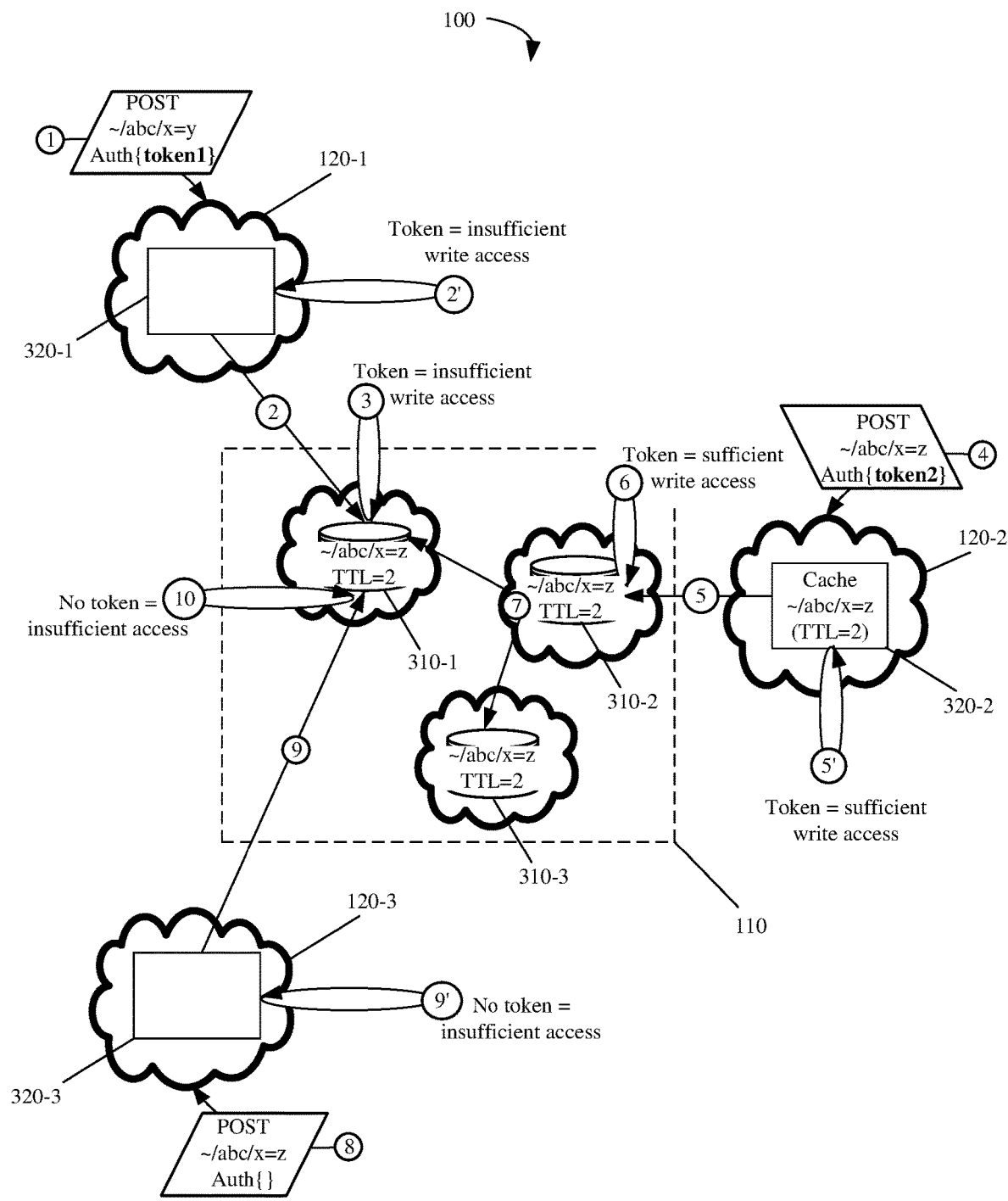
FIG. 6 illustrates an example of authorizing data access to the EKV store in accordance with some embodiments presented herein.

FIG. 6 illustrates an example of authorizing data access to EKV store 110 in accordance with some embodiments presented herein. As shown in FIG. 6, a first user may submit (at 1) a write request (e.g., an HTTP POST message) to first network location 120-1. The write request may include a first token and one or more identifiers that identify a customer, content or service of the customer, and/or key(s) of the content or service. In some embodiments, the first token may be included in the request header (e.g., the Authorization header) or body. In some embodiments, the first token may be specified as part of the URL.

Server 320-1 in first network location 120-1 may provide (at 2) the write request to database 310-1 of EKV store 110. Database 310-1 may determine (at 3) that the first user is not authorized to write to the particular key identified in the write request based on access permissions associated with the first token. For instance, database 310-1 may use the first token to obtain access permissions of the first user (e.g., read and write permissions the first user has with respect to the customer, namespace, and/or keys specified in the request), or may decode the access permissions from the first token. In response to determining (at 3) that the first user is not authorized to write to the particular key, database 310-1 may reject or discard the write request, and/or may return an error message. Alternatively, server 320-1 may analyze the first token, and may reject or discard the write request without forwarding to database 310-1 in response to determining (at 2') that the first user is not authorized to write to the particular key identified in the write request based on the first token that is provided. In any case, the first token may be an encoded or unique value that is associated with a set of access privileges. The set of access privileges may specify different read and write privileges of the first user, and more specifically, which customer namespaces, content or service namespaces, or individual keys the first user has privileges to write to or read from.

FIG. 6 further illustrates a second user submitting (at 4) a write request (e.g., an HTTP POST message) to second network location 120-2. The write request from the second user may include a second token and a different value for the same key that was specified in the write request of the first user.

Server 320-2 in second network location 120-2 may provide (at 5) the write request to database 310-2 of EKV store 110, and database 310-2 may determine (at 6) that the second user is authorized to write to the particular key identified in the write request based on access permissions associated with the second token. Accordingly, database 310-2 may store the key-value pair, and may replicate (at 7) that key-value pair from the second user's write request across databases 310-1 and 310-3 of EKV store 110. In some embodiments, server 320-2 may analyze the second token, and determine (at 5') that the second user is authorized to write to the particular key, based on the access permissions that are associated with the second token, before providing (at 5) the write request to database 310-2. Performing the authorization at network locations 120 can limit the number of bad requests that are received and/or processed at EKV store 110, and thereby saves resources of EKV store 110 for processing valid requests.

A third user may submit (at 8) a write request, that implicates the same particular key, to server 320-3 in third network location 120-3. The third user write request may omit an authorization token or other value for authorizing permissions to read from and/or write to EKV store 110. Accordingly, server 320-3 or database 310-1 may prevent the write request of the third user from updating the value of the particular key (entered as a result of the authorized write request from the second user).

In some embodiments, distributed platform 100 may provide a translator at each database 310, or between EKV store 110 and network locations 120. The translator may convert the network messages and/or URL paths into queries that can be efficiently processed by databases 310. For instance, the translator may convert the request URL into a Cassandra Query Language ("CQL") or Structured Query Language ("SQL") query. Databases 310 may then execute the translated query in order to store or return key-value pairs that are implicated by the query. The translator may convert query results into network messages that can be transferred over a data network to the server 320 or network location 120 that sent the request.

In some embodiments, the query or a query condition may be embedded in the request URL or the request body. For instance, the request URL may specify returning all keys with a value greater than 10. Alternatively, the request body may contain a query for returning keys that begin with the sequence "userA". In any case, the queries can be processed at databases 310, and can cause databases 310 to return a set of values, files, or data rather than pull values for individual keys one at a time.

The data that is retrieved from EKV store 110 by servers 320 may be temporarily cached by those servers 320. The caching of data allows servers 320 to redistribute or reuse the data in response to subsequent user requests without having to access EKV store 110 each time.

In some embodiments, a particular server 320 may cache data in response to receiving a user request to store one or more key-value pairs at EKV store 110. In this case, the particular server 320 may cache the data prior to or concurrent with forwarding the data to EKV store 110 for storage. In other words, the data may be cached without the particular server 320 performing a retrieval operation and with the particular server 320 being in the path of a storage request.

Figure 7:
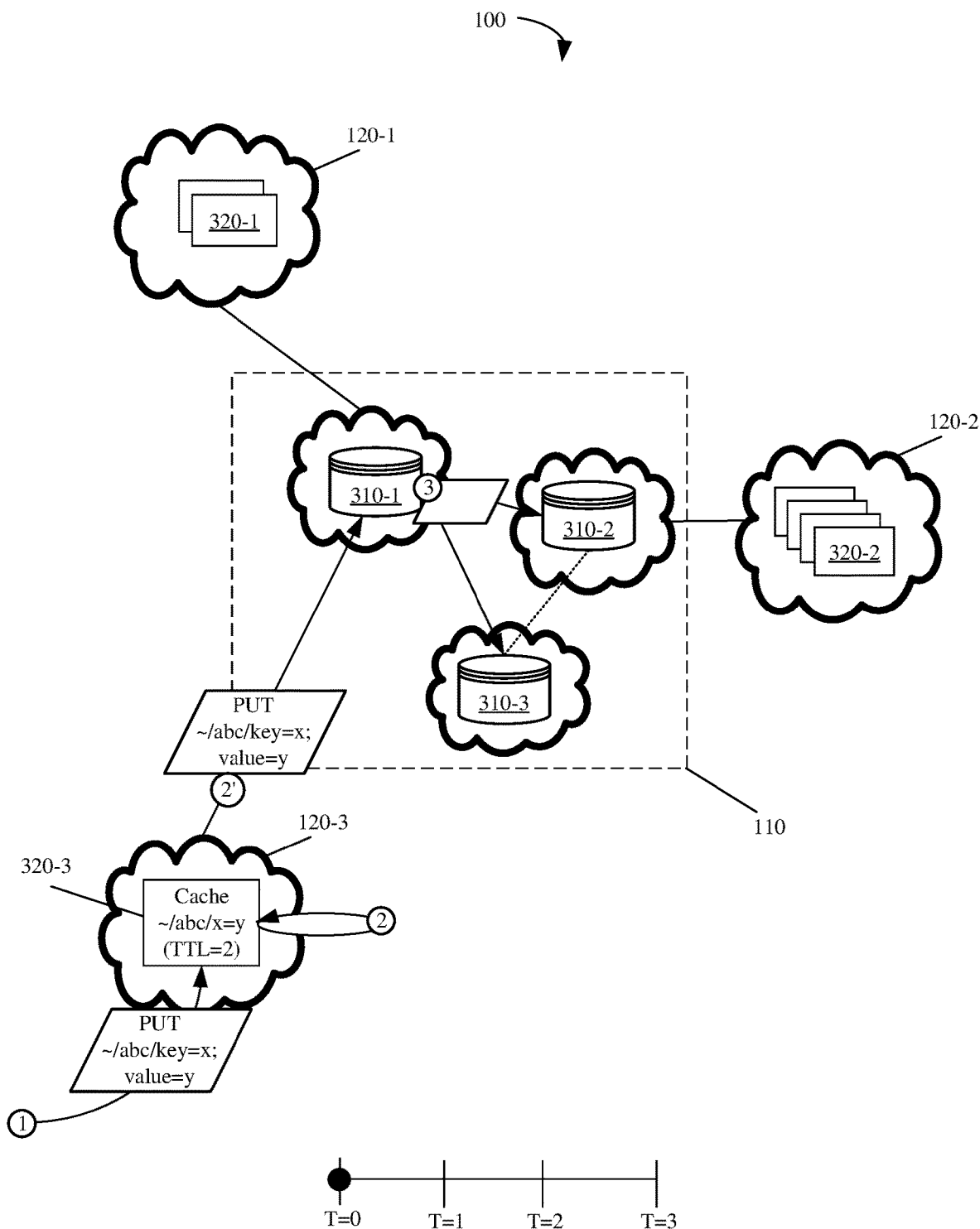
FIG. 7 illustrates an example of caching data as the data is entered in the EKV store in accordance with some embodiments presented herein.

The caching of data at servers 320 may be limited or conditioned to ensure that any value or data that is distributed by servers 320 is synchronized with the value or data that is stored in EKV store 110. FIG. 7 illustrates an example of caching data as the data is entered in EKV store 110 in accordance with some embodiments presented herein.

As shown in FIG. 7, a user may request (at 1) entry of a particular key-value into EKV store 110 via a message (e.g., an HTTP PUT or POST message) that is issued to network location 120-3. Server 320-3 in network location 120-3 may receive (at 1) the message, and may determine that the message is a storage request. In response to determining the message to be a storage request, server 320 may cache (at 2) the particular key-value into local memory or storage, and may provide (at 2') the message to database 310-1 of EKV store 110 for storage therein.

Server 320 may associate a TTL parameter with the particular key-value. The TTL parameters specifies an amount of time that the cached data is valid and can be redistributed without revalidation from EKV store 110. The TTL parameter may be equal to or less than a TTL parameter used by EKV store 110 for stored data. In some embodiments, the TTL parameter may be specified, with or apart from the affected value, as metadata, in the message body, or in a header field of the request. In some other embodiments, the TTL parameter may be specified at the namespace level (e.g., segment 520 from FIG. 5), and the TTL parameter may become a default TTL for all keys set in that namespace. Upon expiration of the TTL parameter, server 320 may remove the particular key-value from cache, or may revalidate the value of the particular key-value with EKV store 110 to ensure that the cached value is synchronized with the value stored by EKV store 110.

Database 310-1 may receive (at 2') the message, may store the particular key-value, and may synchronize (at 3) the particular key-value with other databases 310 of EKV store 110. For instance, database 310-1 may redistribute (at 3) the message to databases 310-2 and 310-3 of EKV store 110 to replicate the particular key-value across each database 310 of EKV store 110.

Figure 8:
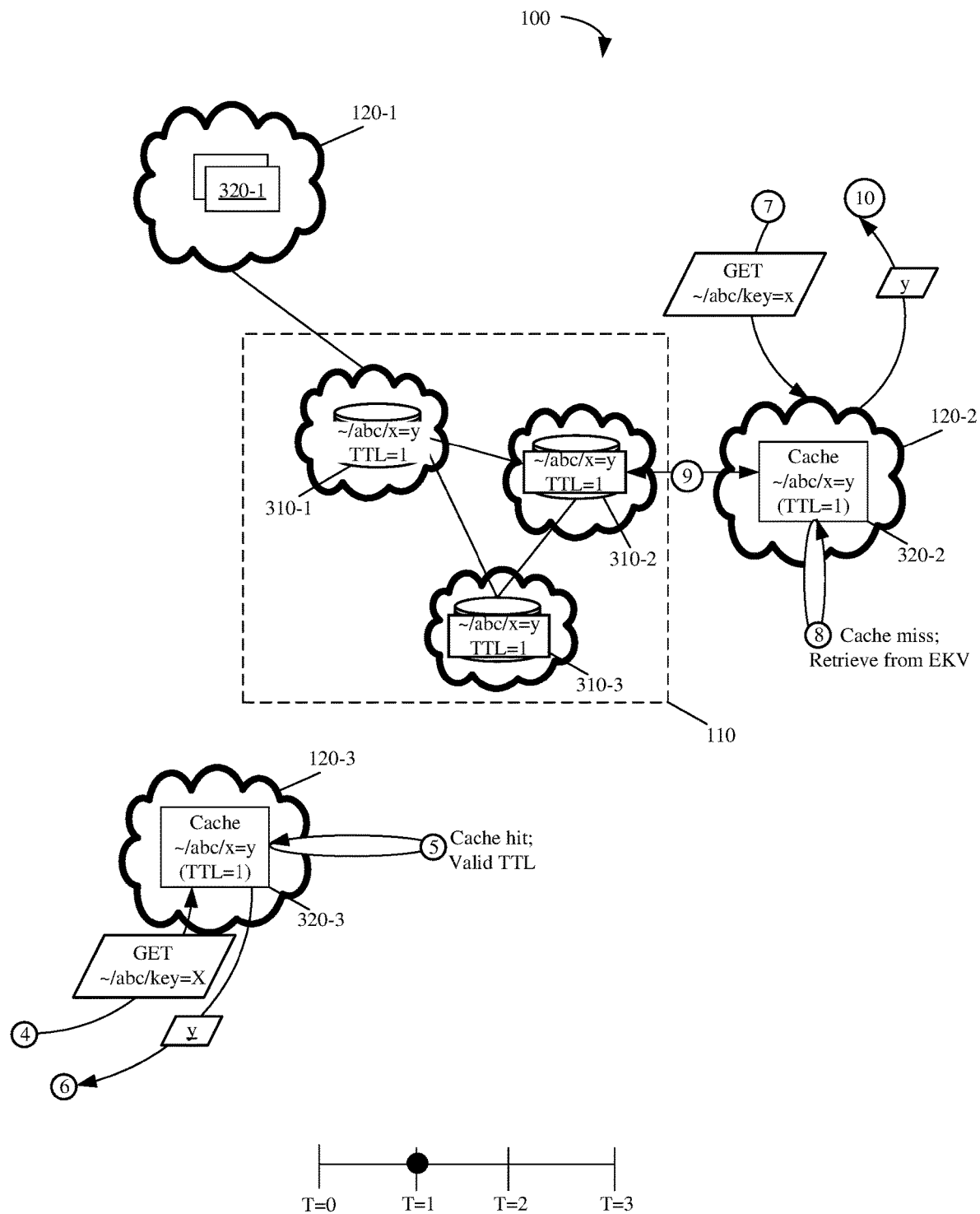
FIG. 8 illustrates operation of the distributed platform in responding to user requests for a particular key-value some time after the particular key-value is entered into the EKV store 110 but before expiration of a time-to-live parameter for the cached particular key-value at a server.

FIG. 8 continues from FIG. 7, and illustrates operation of distributed platform 100 in responding to user requests for the particular key-value some time after the particular key-value is entered into EKV store 110 but before expiration of the TTL parameter for the cached particular key-value at server 320-3. For instance, a user may submit (at 4) a request for the particular key-value that routes to network location 120-3. Server 320-3 may receive (at 4) the request, may determine (at 5) that the request is directed to the particular key-value based on a URL or other identifier of the request, and may determine that the particular key-value is cached locally with a valid TTL parameter. Therefore, in response to the request, server 320-3 may provide (at 6) the value for the particular key-value directly from cache without accessing EKV store 110.

Another request for the particular key-value may arrive (at 7) at network location 120-2. The particular key-value is not yet cached by any server 320-2 in network location 120-2. Accordingly, the request may result (at 8) in a cache miss. In response to the cache miss, server 320-2, that receives the request at network location 120-2, may retrieve (at 9) the particular key-value from EKV store 110 (e.g., database 310-2 that is closest to network location 120-2). Server 320-2 may cache the particular key-value with a TTL parameter that matches to a TTL parameter for the particular key-value stored at EKV store 110. Server 320-2 may provide (at 10) the value for the particular key-value to the requestor. Since the particular key-value was not previously cached at network location 120-2 but was previously cached at network location 120-3, network location 120-3 is able to respond to an initial request for the particular key-value with less latency than network location 120-2.

If the TTL parameter associated with the cached data at network locations 120 is for a minimal amount of time (e.g., less than 5 seconds), the data is not frequently updated, and/or the data is unlikely to be updated in the duration of the TTL parameter, then the cached data may be served without validation with EKV store 110 from network locations 120 as shown in FIG. 8. In this case, there is minimal or no concern with the cached data becoming desynchronized with the data that is stored and/or updated in EKV store 110.

However, if the TTL parameter associated with the cached data at network locations 120 may be for a longer amount of time (e.g., more than 5 seconds), the data is frequently updated, and/or the data is likely to be updated in the duration of the TTL parameter, then servers 320 at network locations 120 may be configured to revalidate cached data with EKV store 110 before redistributing the cached data in response to received user requests, other triggers, or other conditions (e.g., revalidate every 3 seconds or every third request). In this case, the cached data can be redistributed from network locations 120 once the data has been revalidated to ensure that the data has not been updated at EKV store 110 via one of the other network locations 120. The revalidation incurs a minimal penalty, but latency may still be reduced if the cached data remain synchronized with the data in EKV store 110 and does not have to be retrieved anew from EKV store 110.

Figure 9:
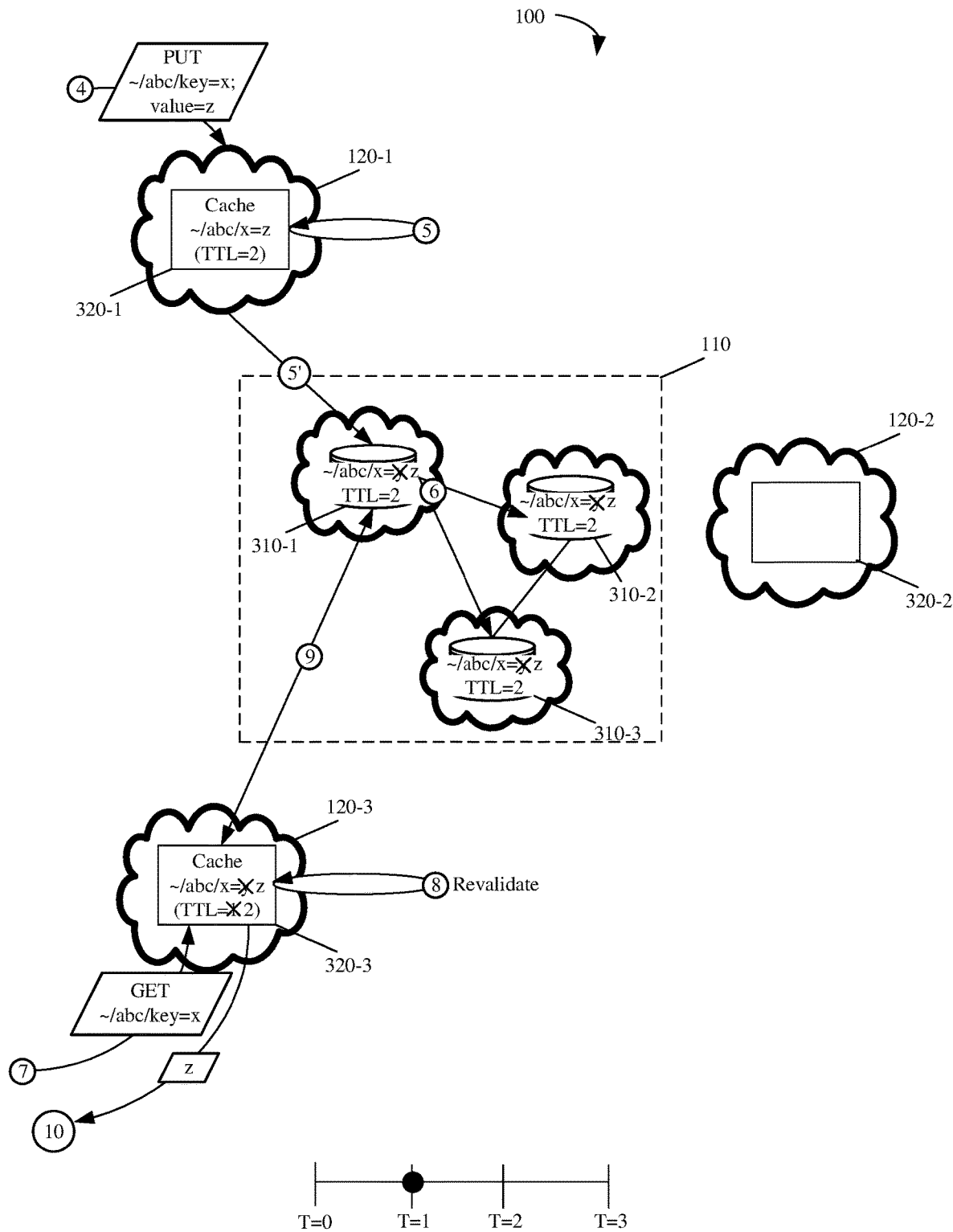
FIG. 9 illustrates an example of the distributed platform redistributing cached data from different network locations after revalidation with the EKV store in accordance with some embodiments presented herein.

FIG. 9 illustrates an example of distributed platform 100 redistributing cached data from network locations 120 after revalidation with EKV store 110 in accordance with some embodiments presented herein. FIG. 9 continues from FIG. 7, and illustrates a user updating (at 4), via network location 120-1, the particular key-value that was previously entered into EKV store 110 via network location 120-2. In this figure, server 320-1 in network location 120-1 may receive (at 4) the update, may determine that the particular key-value is not locally cached, may cache (at 5) the particular key-value with the updated value in local memory or storage, and may forward (at 5') the update to database 310-1 of EKV store 110.

Database 310-1 may determine that the update is for a particular key that is stored with an older value. Accordingly, database 310-1 may replace the older value with the new value from the update, and may synchronize the particular key-value across EKV store 110 by providing (at 6) the update to other databases 310-2 and 310-3 of EKV store 110. As a result of the update to the particular key-value made via network location 120-1, the cached value for the particular key-value at network location 120-3 may become invalid, even though the cached value at network location 120-3 has a TTL parameter that is not expired.

A user may issue (at 7) a request for the particular key-value to network location 120-3 before the TTL parameter associated with the cached value for the particular key-value at network location 120-3 expires. Server 320-3 may receive (at 7) the request, may determine that a value is cached for the particular key-value, and may perform (at 8) a revalidation of the cached value as a result of the request satisfying a revalidation condition (e.g., revalidate for every request, after some amount of time, or some number of requests for the particular key-value).

The revalidation may include server 320-3 querying EKV store 110 in order to determine if the particular key-value stored at EKV store 110 is different than the particular key-value cached by server 320-3. The revalidation may be based on a difference in the TTL parameter or timestamp stored for the particular key-value by server 320-3 and EKV store 110.

In FIG. 9, EKV store 110 may determine that server 320-3 caches an older value, and responds to the query by providing (at 9) the updated value for the particular key-value. Server 320-3 may then update its cache, and may provide (at 10) the correct value obtained from EKV store 110 to the requesting user.

In some embodiments, an efficient revalidation is performed by generating a unique identifier whenever a key-value pair is set in EKV store 110. The unique identifier may be provided to a particular server 320 setting the key-value pair in EKV store 110 and caching the key-value pair. Should the particular server 320 need to revalidate the key-value pair, the particular server 320 may provide the unique identifier to EKV store 110, and EKV store can respond with a 304 NOT MODIFIED message if the key-value has not changed and is still valid, wherein the 304 message may be a more efficient reply from EKV store 110 than responding to query because no data is included with the 304 message.

The revalidation may impose no overhead when the cached value at a network location 120, that receives a request for that cached value, is invalid (as shown in FIG. 9) since the cached value cannot be redistributed and has to be replaced with the updated value from EKV store 110. The revalidation may impose little overhead (e.g., minimal additional latency) when the cached value at a network location 120, that receives a request for that cached value, is valid and revalidation is performed to ensure that the value has not changed at EKV store 110. The additional overhead may include the round-trip time to pass messaging between the network location and EKV store 110, but does not incur the time needed to retrieve the data or an updated value from EKV store 110 and to return that data or updated value.

To eliminate the revalidation penalty, the revalidation may occur before a request is received for cached content. For instance, server 320-3 may revalidate cached key-value pairs every five seconds, and a request for a particular cached key-value pair, that arrives anytime between the five second revalidation, can be immediately responded to from cache by providing the particular cached key-value pair without contacting EKV store 110 for another revalidation. In other words, the revalidation of cached data can occur independently of user requests for that data, such that the cached data can be assumed to be synchronized with EKV store 110 and can be immediately served from cache without further access to EKV store 110 when a request for that data is received by servers 320.

In some embodiments, the revalidation is initiated by databases 310 of EKV store 110 rather than by servers 320 in network locations 120. For instance, in response to a write request for particular data, the database 310, that receives the write request, may track which network location 120 issued the write request. Databases 310 may store the Internet Protocol ("IP") address or other network identifier for the issuing network location 120 or server 320. Should the particular data be subsequently updated from another network location 120 or server 320, the database 310 may detect that the update is directed to the particular data, may determine that the update is issued from another network location 120 or server 320, and may provide a message to the tracked network location 120 or server 320 using the tracked network address to invalidate the old instance of the particular data cached at the tracked network location 120 or server 320. In response to the message, the old instance of the particular data may be removed from cache, and/or may be replaced with the new instance that is retrieved from EKV store 120.

The geographically distributed implementation of EKV store 110 provides redundancy, resiliency, and failover in the event that one of databases 310 becomes unavailable or inaccessible. Specifically, servers 320 may continue to write data to and receive synchronized data from EKV store 110 in the event of one or more databases 310 becoming unavailable by switching from a primary database 310 that becomes unavailable to a secondary database 310 of EKV store 110 that remains available and accessible.

Figure 10:
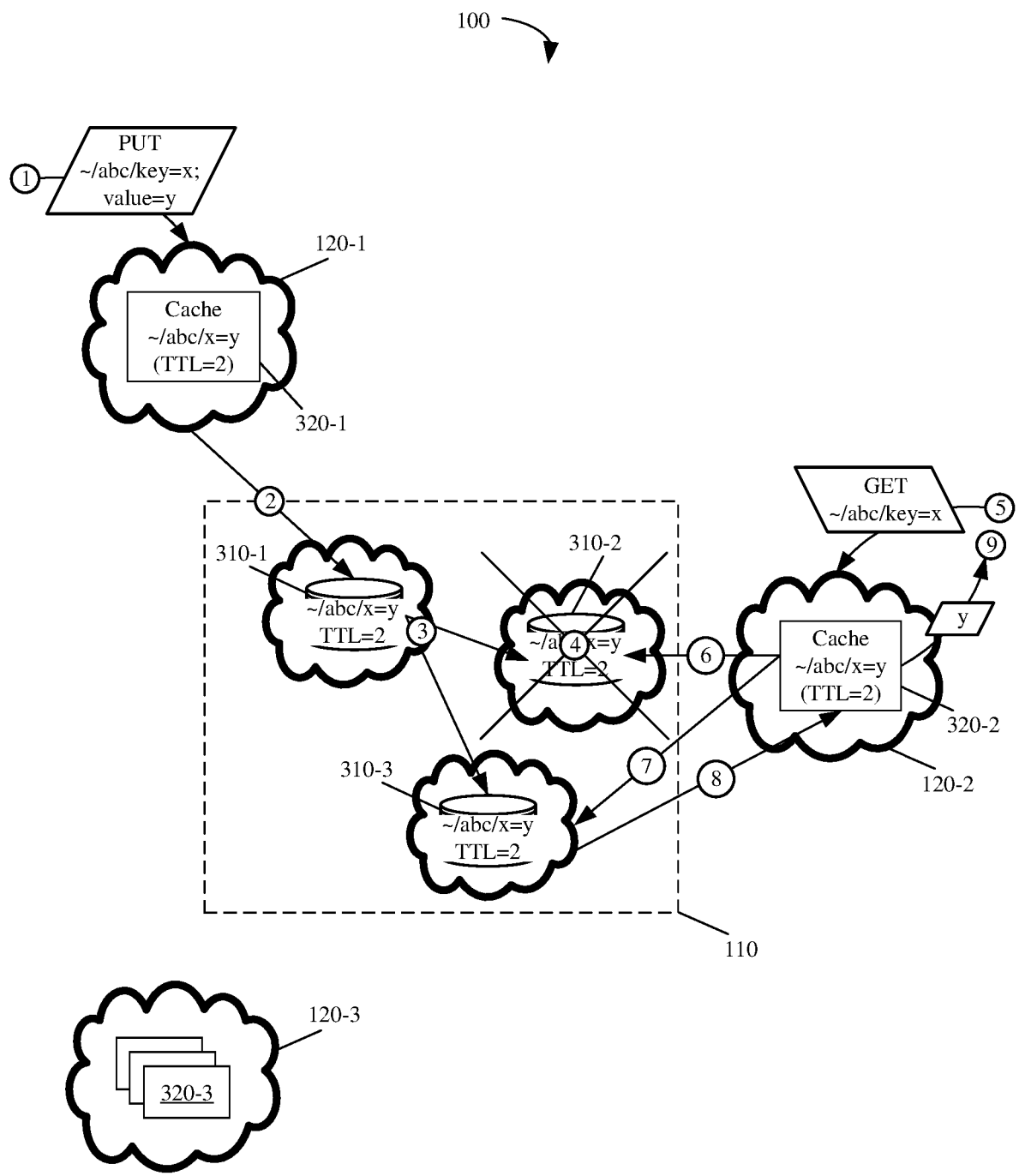
FIG. 10 illustrates an example of synchronized data resiliency provided by the EKV store for different network locations of the distributed platform in accordance with some embodiments presented herein.

FIG. 10 illustrates an example of synchronized data resiliency provided by EKV store 110 for network locations 120 of distributed platform 100 in accordance with some embodiments presented herein. As shown in FIG. 10, a write request may be issued (at 1) to first network location 120-1 to write data (e.g., a particular key-value) to EKV store 110. The write request may be forwarded (at 2) from first network location 120-1 to database 310. Database 310-1 may perform (at 3) a synchronization procedure to replicate the data across databases 310-2 and 310-3 of EKV store 110.

After or during the synchronization procedure, database 310-2 may become unavailable. For instance, database 310-2 may experience a device, software, or network failure that causes database 310-2 to become inaccessible. A user may issue (at 5) a read request to second network location 120-2 for the data that was previously written (at 3) to EKV store 110.

Server 310-2 in second network location 120-2 may first attempt to read (at 6) the data from database 310-2. Server 310-2 may issue (at 6) the read request to database 310-2 when database 310-2 is the closest database 310 of EKV store 110 to second network location 120-2, or when database 310-2 is otherwise selected as the primary database for second network location 120-2.

The read from database 310-2 may fail when database 310-2 is unavailable. Accordingly, second network location 120-2 may reattempt the read (at 7) from database 310-3 of EKV store 110. In some embodiments, servers 320 in each of network locations 120 may be configured with the network addressing of each database 310 of EKV store 110 such that if one database 310 becomes unavailable, servers 320 may submit the request to the network address of a next database 310. The network addresses may be prioritized or ordered based on performance, proximity, and/or other criteria.

Database 310-3 may remain operational despite database 310-2 becoming (at 4) unavailable. Accordingly, database 310-3 may provide (at 8) the requested data to second network location 120-2, and second network location 120-2 may forward (at 9) the data to the requesting user.

In some embodiments, servers 320 may failover or switch between databases 310 of EKV store 110 when performance or responsiveness of a database 310 does not satisfy threshold or when a network path to one database 310 becomes congested. Servers 320 may also switch between databases 310 to redistribute load across databases 310 and to prevent any single database 310 from being overloaded with queries.

In some embodiments, EKV store 110 may also be used for internal statistical monitoring. For instance, servers 320 from different network locations 120 may write different performance metrics or statistics to EKV store 110, and databases 310 may aggregate the written data to form a holistic view of distributed platform 100. Moreover, the monitoring can be used to shield EKV store 110 from attack.

Figure 11:
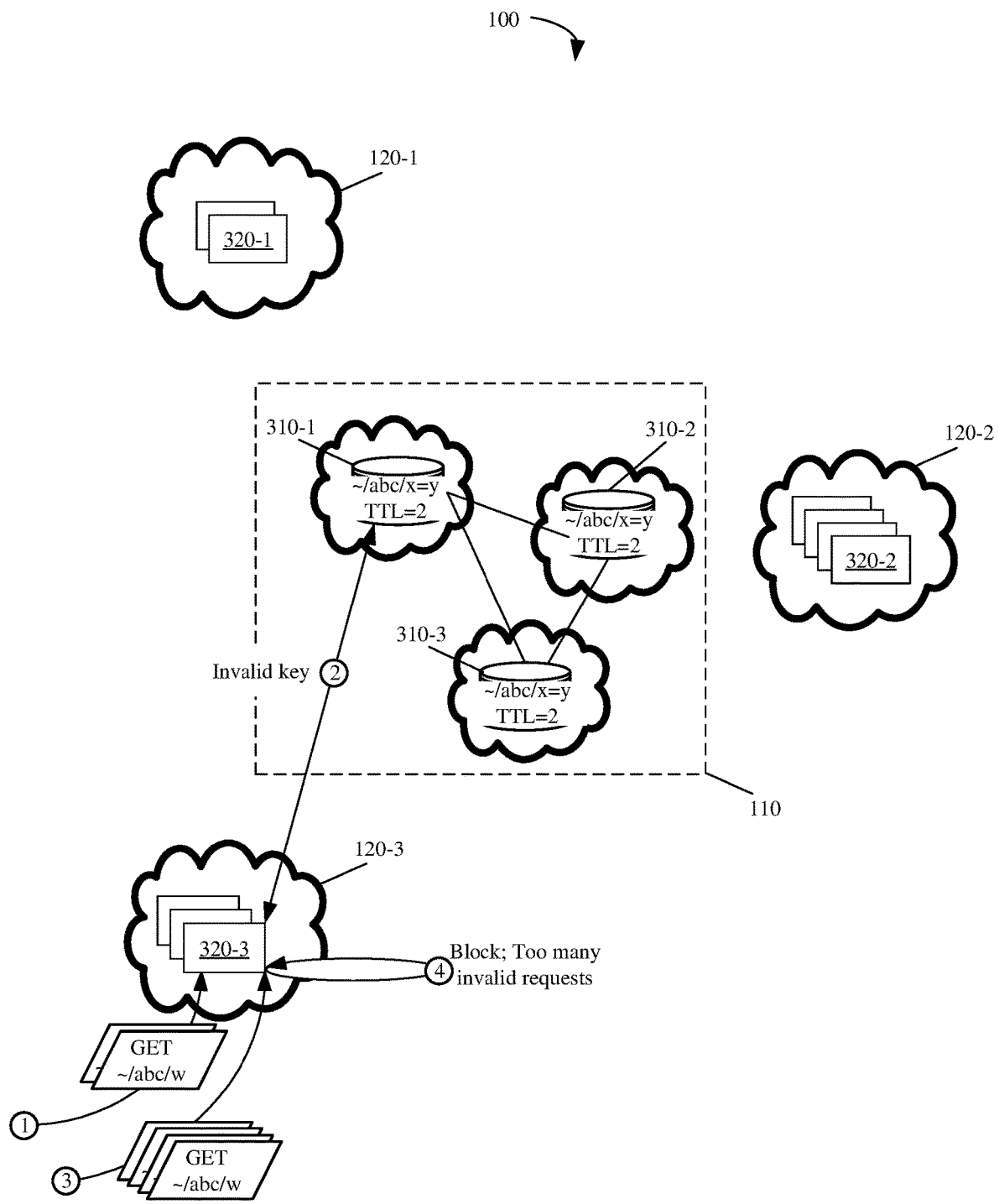
FIG. 11 illustrates an example of servers at different network locations analyzing requests that are directed to the EKV store for attack protection or rate limiting purposes in accordance with some embodiments presented herein.

FIG. 11 illustrates an example of servers 320 at network locations 120 analyzing requests that are directed to EKV store 110 for attack protection or rate limiting purposes in accordance with some embodiments presented herein. In FIG. 11, one or more users may issue (at 1), to servers 320-3 at third network location 120-3, a high volume of requests to read an invalid or nonexistent key. An initial set of the requests may be provided (at 2) to EKV store 110, and EKV store 110 may return an error code or message to notify servers 320-3 that the requested key does not exist or is invalid.

In response to the error codes from EKV store 110, servers 320-3 may detect that distributed platform 100 is being attacked (e.g., an attack designed to render EKV store 110 unresponsive by overwhelming EKV store 110 with requests). Accordingly, servers 320-3 may configure and/or implement attack protections such that subsequent requests issued (at 3) from the same users and/or that are directed to the invalid key are blocked (at 4) at third network location 120-3 without being forwarded and/or processed at EKV store 110.

As noted above, EKV store 110 may track the number of invalid requests made by a set of users or invalid requests that are directed to a set of data via messaging or requests forwarded from network locations 120. In some embodiments, EKV store 110 may instruct servers 320 at one or more network location 120 to activate attack protection against the identified users or against requests targeting the set of data. For instance, the number of invalid requests for a particular content, service, or data from each network location 120 may not be sufficient to detect an attack at any one network location 120. However, databases 310 may increment a counter for each invalid request, and may determine that the cumulative number of invalid requests across distributed platform 100 are sufficient to detect a platform-wide attack. In this case, databases 310 may activate attack protections to prevent forwarding of requests for the particular content, service, or data from network locations 120. In other words, databases 310 can directly control attack protection and/or other functionality of servers 320 at network locations 120.

Figure 12:
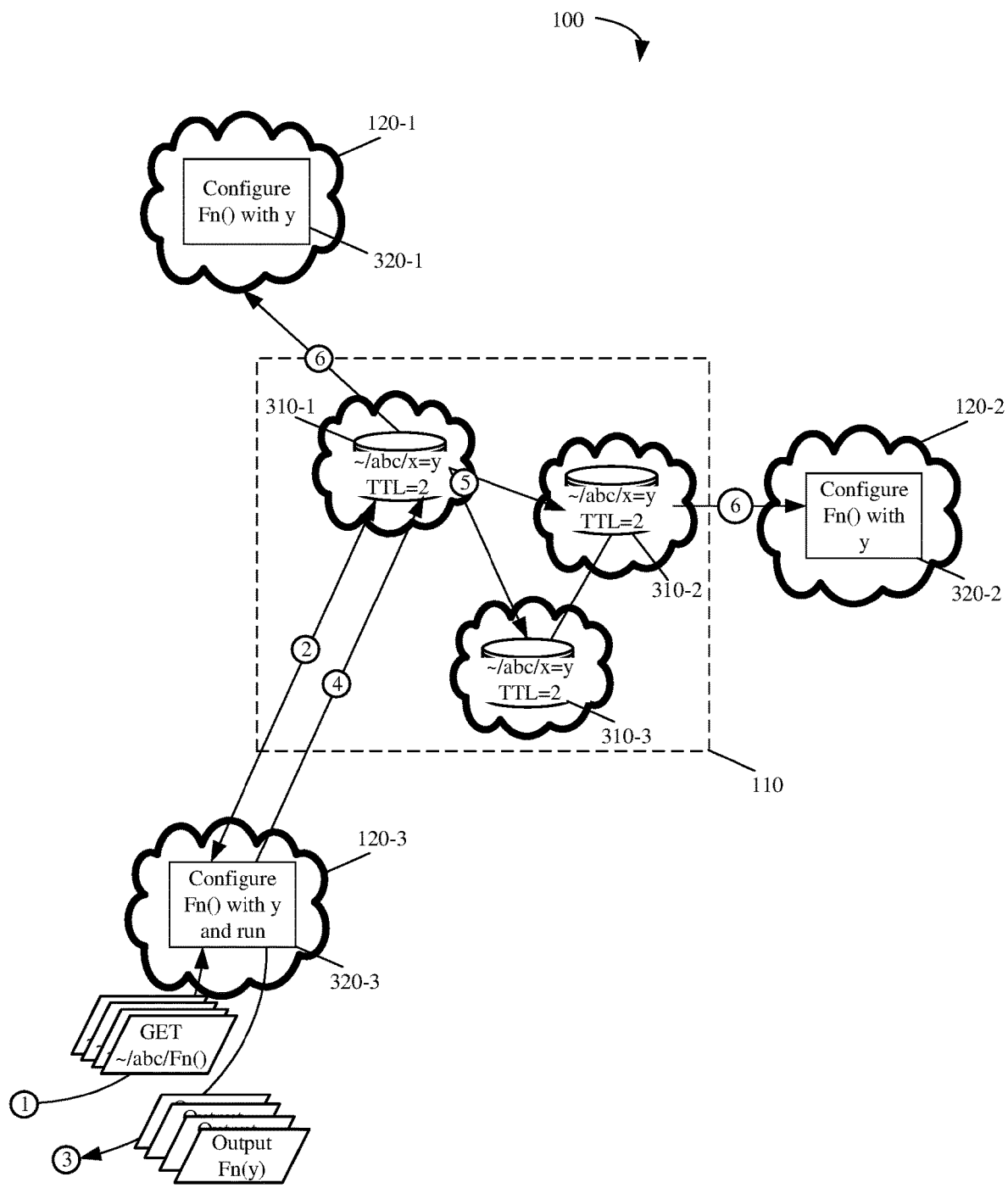
FIG. 12 illustrates an example of the automated data distribution performed by the EKV store in accordance with some embodiments presented herein.

In some embodiments, EKV store 110 may intelligently and/or automatically distribute data to network locations 120 based on data demand, significance, and/or other criteria. FIG. 12 illustrates an example of the automated data distribution performed by EKV store 110 in accordance with some embodiments presented herein.

FIG. 12 illustrates several requests to execute a particular service being issued (at 1) to third network location 120-3. Servers 320-3 at third network location 120-3 may retrieve (at 2) configuration and/or input data for the particular service from database 310-1 of EKV store 110. In some embodiments, the data may be retrieved once, cached by servers 320-3, and reused to execute (at 3) the particular service in response to each request that is received while a TTL parameter for the data remains valid. In some other embodiments, the data may be retrieved multiple times in order to execute different instances of the particular service on different servers 320-3 in order to meet the demand.

In any case, the demand for the particular service and/or data associated with the particular service may exceed a threshold. Servers 320-3 may notify (at 4) EKV store 110 of the demand for the particular service, or database 310-1 may track the demand based on requests from third network location 120-3.

In response to the demand, database 310-1 may instruct (at 5) other databases 310-2 and 310-3 of EKV store 110 to prepopulate the particular service and/or corresponding data to other network locations 120-1 and 120-2. Accordingly, database 310-1 may configure (at 6) one or more servers 320-1 at first network location 120-1 with the particular service and the corresponding configuration and/or input data, and database 310-2 may configure (at 6) one or more servers 320-2 at second network location 120-2 with the particular service and the corresponding configuration and/or input data. As a result of the automatic distribution, servers 320 in network locations 120-1 and 120-2 may immediately respond to requests for the particular service without accessing EKV store 110 as a result of preloading the particular service and the configuration and/or input data for the particular service based on the demand for the particular service at third network location 120-3.

Figure 13:
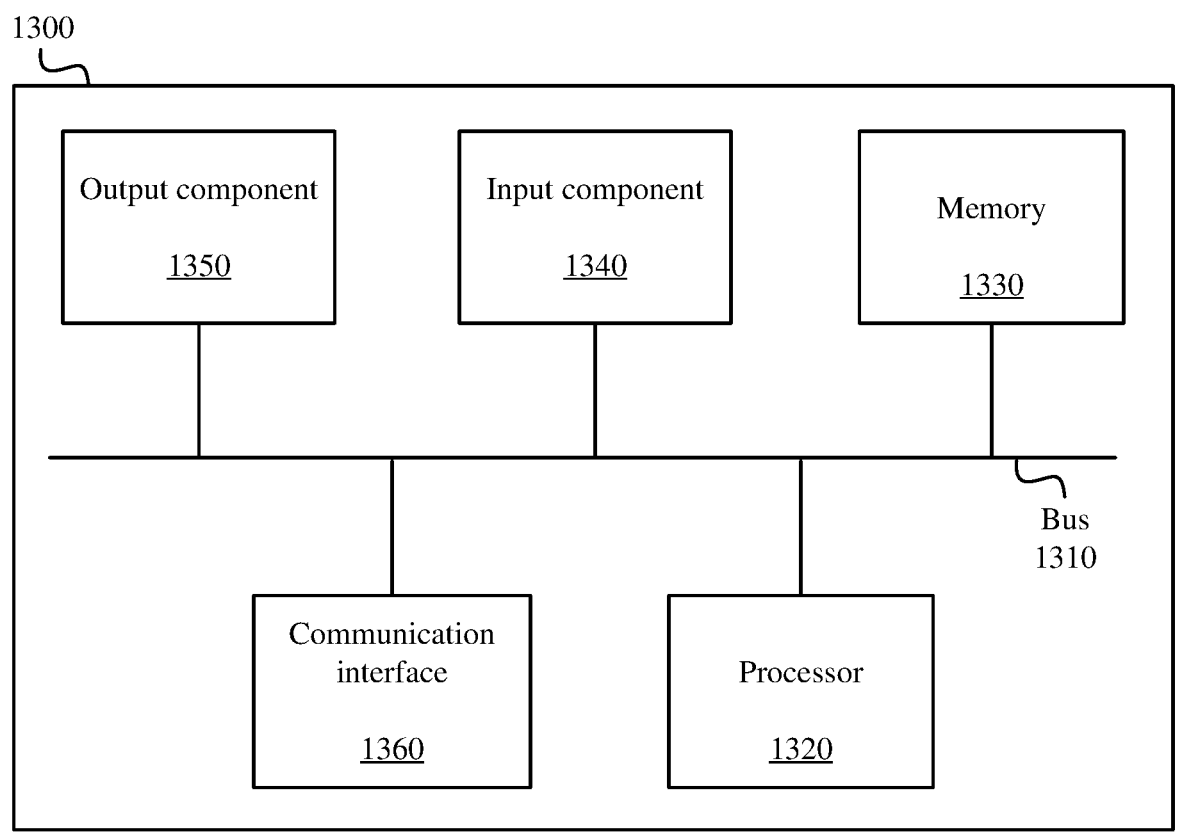
FIG. 13 illustrates example components of one or more devices, according to one or more embodiments described herein.

FIG. 13 is a diagram of example components of device 1300. Device 1300 may be used to implement one or more of the devices or systems described above (e.g., databases 310, servers 320, etc.). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the terms "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a first value for a first key at a first storage that is located in a first network location of a distributed platform based on a first message issued by a first user to the first network location;
   receiving a second value for the first key at a second storage that is located in a second network location of the distributed platform based on a second message issued by a second user to the second network location, and wherein the second message arrives at the second network location before the first value from the first message is distributed for storage across different network locations of the distributed platform;
   comparing properties of the first message received at the first network location with properties of the second message received at the second network location in selecting between distributed storage of the first value or the second value for the first key across the different network locations of the distributed platform;
   storing the second value as a current value for the first key at the first storage and the second storage in response to forming a consensus on the second value over the first value based on said comparing of the properties of the first message and the second message; and
   distributing, in response to a request that is directed to the first key, the second value from (i) the first storage based on the request issuing to the first network location and (ii) the second storage based on the request issuing to the second network location.

2. The method of claim 1, wherein storing the second value comprises:
   replicating the second value at the first storage in response to forming the consensus on the second value and the second storage distributing the second value to the first storage.

3. The method of claim 1 further comprising:
   receiving, from a third user, a service request for a particular service at the first network location;
   determining that the first key is a configuration parameter or input parameter for the particular service;
   executing, at the first network location, the particular service configured with the second value from the first storage.

4. The method of claim 1, wherein receiving the second value comprises:
   determining that the second message comprises a Uniform Resource Locator ("URL"), and the first key and the second value in one or more of the URL, message header, and message body; and
   translating the URL into a database query that is executed by the first storage and the second storage.

5. The method of claim 1 further comprising:
   determining that the first user is not authorized to write to the first key based on an invalid authorization token or no authorization token being submitted with the first message; and
   determining that the second user is authorized to write to the first key based on a valid authorization token being submitted with the second message.

6. The method of claim 1 further comprising:
   caching the second value at a server in the second network location based on said distributing;
   replacing the second value for the first key with a third value at the first storage and the second storage based on a third message issued by a third user through the first network location after said distributing;
   providing the third value from the server in response to a second request that is directed to the first key arriving at the server, wherein said providing comprises:
      invaliding the second value cached by the server based on the second value differing from the third value; and
      retrieving the third value from the second storage in response to said invalidating.

7. The method of claim 1, wherein said distributing comprises:
   providing the second value from the first network location in response to a content request that identifies the first key and that is issued by a third user to the first network location.

8. The method of claim 1 further comprising:
   receiving a third value for the first key at the second storage based on a third message issued by a third user to the second network location;
   wherein said storing comprises:
      storing the second value for the first key in a first namespace in response to the second message specifying one or more identifiers of the first namespace; and
      storing the third value for the first key in a different second namespace, that does not overwrite or invalidate the second value for the first key in the first namespace, in response to the third message specifying one or more identifiers of the second namespace.

9. The method of claim 8, wherein said distributing comprises:
   receiving, at first network location, a first service request for a service by a third user;
   configuring the service at the first network location with the second value based on one or more identifiers of the first service request mapping to the first namespace;
   executing the service configured with the second value;
   receiving, at the first network location, a second service request for the service by a fourth user; and
   reconfiguring the service at the first network location with the third value based on one or more identifiers of the second service request mapping to the second namespace.

10. The method of claim 8, wherein said distributing comprises:

receiving, at the first network location, a first content request for content of a first content provider;

retrieving, from the first storage, the second value based on the content mapping to the first key and one or more identifiers of the first content provider mapping to the first namespace;

serving the second value in response to the first content request;

receiving, at the first network location, a second content request for content of a second content provider;

retrieving, from the first storage, the third value based on the content mapping to the first key and one or more identifiers of the second content provider mapping to the second namespace; and serving the third value in response to the second content request.

11. The method of claim 1, wherein comparing the properties comprises:
determining that a timestamp of the second message is newer than a timestamp of the first message.

12. The method of claim 1, wherein comparing the properties comprises:
determining that a priority associated with the second user is higher than a priority associated with the first user.

13. The method of claim 1 further comprising:
instantiating a service at the first network location that uses the first key as input; and
providing the second value received at the second network location as input to the service instantiated at the first network location in response to storing the second value as the current value for the first key across the different network locations of the distributed platform.

14. A distributed platform comprising:
a first network location with one or more servers for receiving and responding to user requests from a first geographic region;
a second network location with one or more servers for receiving and responding to user requests from a second geographic region;
a distributed key value store comprising at least first and second storage devices that are geographically distributed to the first network location and the second network location respectively, and one or more processors configured to:
receive a first value for a first key at the first storage device based on a first message issued by a first user to the first network location;
receive a second value for the first key at the second storage device based on a second message issued by a second user to the second network location, wherein the second message arrives at the second network location before the first value from the first message is distributed for storage across different network locations of the distributed platform;
compare properties of the first message received at the first network location with properties of the second message received at the second network location in selecting between distributed storage of the first value or the second value for the first key across the different network locations of the distributed platform;
store the second value as a current value for the first key at the first storage device and the second storage device in response to forming a consensus on the second value over the first value based on said comparing of the properties of the first message and the second message; and distribute, in response to a request that is directed to the first key, the second value from (i) the first storage device based on the request issuing to the first network location and (ii) the second storage device based on the request issuing to the second network location.

15. The distributed platform of claim 14, wherein the one or more processors are further configured to:
receive, from a third user, a service request for a particular service at the first network location;
determine the first key is a configuration parameter or input parameter for the particular service;
execute, with the one or more servers at the first network location, the particular service configured with the second value from the first storage device.

16. The distributed platform of claim 14, wherein the one or more processors are further configured to:
determine that the first user is not authorized to write to the first key based on an invalid authorization token or no authorization token being submitted with the first message; and
determine that the second user is authorized to write to the first key based on a valid authorization token being submitted with the second message.

17. The distributed platform of claim 14, wherein the one or more processors are further configured to:
receive a third value for the first key at the second storage device based on a third message issued by a third user to the second network location;
wherein, in order to store the second value, the one or more processors are further configured to:
store the second value for the first key in a first namespace in response to the second message specifying one or more identifiers of the first namespace; and
store the third value for the first key in a different second namespace, that does not overwrite or invalidate the second value for the first key in the first namespace, in response to the third message specifying one or more identifiers of the second namespace.

18. The distributed platform of claim 17, wherein, in order to distribute the second value, the one or more processors are further configured to:
receive, at the first network location, a first service request for a service by a third user;
configure the service at the first network location with the second value based on one or more identifiers of the first service request mapping to the first namespace;
execute the service configured with the second value using the one or more servers at the first network location;
receive, at the first network location, a second service request for the service by a fourth user; and
reconfigure the service at the first network location with the third value based on one or more identifiers of the second service request mapping to the second namespace.

19. The distributed platform of claim 17, wherein, in order to distribute the second value, the one or more processors are further configured to:
receive at the first network location, a first content request for content of a first content provider;
retrieve, from the first storage, the second value based on the content mapping to the first key and one or more identifiers of the first content provider mapping to the first namespace;

serve the second value in response to the first content request;

receive, at the first network location, a second content request for content of a second content provider;

retrieve, from the first storage, the third value based on the content mapping to the first key and one or more identifiers of the second content provider mapping to the second namespace; and serve the third value in response to the second content request.

20. A non-transitory computer-readable medium, storing a set of processor-executable instructions, which, when executed by one or more processors, cause the one or more processors to:

receive a first value for a first key at a first storage that is located in a first network location of a distributed platform based on a first message issued by a first user to the first network location;

receive a second value for the first key at a second storage that is located in a second network location of the distributed platform based on a second message issued by a second user to the second network location, wherein the second message arrives at the second network location before the first value from the first message is distributed for storage across different network locations of the distributed platform;

compare properties of the first message received at the first network location with properties of the second message received at the second network location in selecting between distributed storage of the first value or the second value for the first key across the different network locations of the distributed platform;

store the second value as a current value for the first key at the first storage and the second storage in response to forming a consensus on the second value over the first value based on said comparing of the properties of the first message and the second message; and distribute, in response to a request that is directed to the first key, the second value from (i) the first storage based on the request issuing to the first network location and (ii) the second storage based on the request issuing to the second network location.

* * * * *